United States Patent
Wei et al.

(10) Patent No.: US 9,910,440 B2
(45) Date of Patent: Mar. 6, 2018

(54) ESCAPE-PATH-PLANNING SYSTEM FOR AN AUTOMATED VEHICLE

(71) Applicant: Delphi Technologies, Inc., Troy, MI (US)

(72) Inventors: Junqing Wei, Bridgeville, PA (US); Wenda Xu, Pittsburgh, PA (US); Jarrod M. Snider, Pittsburgh, PA (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/154,192

(22) Filed: May 13, 2016

(65) Prior Publication Data
US 2017/0329338 A1 Nov. 16, 2017

(51) Int. Cl.
*G01C 21/34* (2006.01)
*G05D 1/02* (2006.01)
*G05D 1/00* (2006.01)

(52) U.S. Cl.
CPC ......... *G05D 1/0212* (2013.01); *G05D 1/0088* (2013.01); *G05D 2201/0213* (2013.01)

(58) Field of Classification Search
CPC . B60W 10/20; B60W 2750/30; B62D 15/025; B62D 15/0255; B62D 15/0265; B60Q 1/54; G01C 21/34; G08G 1/166; G08G 1/167
USPC .................... 701/25, 26; 180/168, 170, 401; 318/587; 340/435; 342/457, 357.25
See application file for complete search history.

(56) References Cited

U.S. PATENT DOCUMENTS

| 5,521,579 | A | * | 5/1996 | Bernhard | ........... | B60K 31/0008 |
| | | | | | | 180/167 |
| 6,026,347 | A | * | 2/2000 | Schuster | .................. | B62D 1/28 |
| | | | | | | 180/167 |
| 2010/0228419 | A1 | | 9/2010 | Lee et al. | | |
| 2011/0190972 | A1 | * | 8/2011 | Timmons | ............... | G01C 21/34 |
| | | | | | | 701/31.4 |

(Continued)

OTHER PUBLICATIONS

Rahul Kala, et al: "Motion Planning of Autonomous Vehicles on a Dual Carriageway without Speed Lanes", dated Jan. 13, 2015, pp. 59-81.

*Primary Examiner* — Dalena Tran
(74) *Attorney, Agent, or Firm* — Lawrence D. Hazelton

(57) ABSTRACT

An escape-path-planning system to operate an automated vehicle includes an object-detector and a controller. The object-detector is suitable for use on a host-vehicle. The object-detector is used to detect an other-vehicle in an adjacent-lane next to a present-lane traveled by the host-vehicle. The controller is in communication with the object-detector. The controller is configured to, in response to a lane-change-request, determine a first-route-plan that steers the host-vehicle from the present-lane to the adjacent-lane, determine a second-route-plan that steers the host-vehicle into the present-lane, initiate the first-route-plan when a forecasted-distance between the other-vehicle and the host-vehicle is greater than a distance-threshold, and cancel the first-route-plan and select the second-route-plan when the forecasted-distance between the other-vehicle and the host-vehicle becomes less than the distance-threshold after the first-route-plan is initiated. The second-route-plan is a pre-planned escape-path that is instantly available if needed that provides a smoother travel-experience for an occupant of the host-vehicle.

3 Claims, 3 Drawing Sheets

(56) References Cited

U.S. PATENT DOCUMENTS

2014/0207325 A1* 7/2014 Mudalige ............. B62D 15/025
　　　　　　　　　　　　　　　　　　701/26
2016/0137199 A1　5/2016 Kuhne
2017/0123430 A1* 5/2017 Nath .................... G05D 1/0223

* cited by examiner

ESCAPE-PATH-PLANNING SYSTEM FOR AN AUTOMATED VEHICLE

TECHNICAL FIELD OF INVENTION

This disclosure generally relates to an escape-path-planning system to operate an automated vehicle, and more particularly relates to a system that cancels a first-route-plan to select a second-route-plan when the forecasted-distance between an other-vehicle and the host-vehicle unexpectedly becomes less than the distance-threshold.

BACKGROUND OF INVENTION

It is known for an automated vehicle to change lanes as part of normal operation. However, when unexpected situations arise, the response of the automated vehicle may not be acceptably smooth.

SUMMARY OF THE INVENTION

In accordance with one embodiment, an escape-path-planning system to operate an automated vehicle is provided. The system includes an object-detector and a controller. The object-detector is suitable for use on a host-vehicle. The object-detector is used to detect an other-vehicle in an adjacent-lane next to a present-lane traveled by the host-vehicle. The controller is in communication with the object-detector. The controller is configured to, in response to a lane-change-request, determine a first-route-plan that steers the host-vehicle from the present-lane to the adjacent-lane, determine a second-route-plan that steers the host-vehicle into the present-lane, initiate the first-route-plan when a forecasted-distance between the other-vehicle and the host-vehicle is greater than a distance-threshold, and cancel the first-route-plan and select the second-route-plan when the forecasted-distance between the other-vehicle and the host-vehicle becomes less than the distance-threshold after the first-route-plan is initiated.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
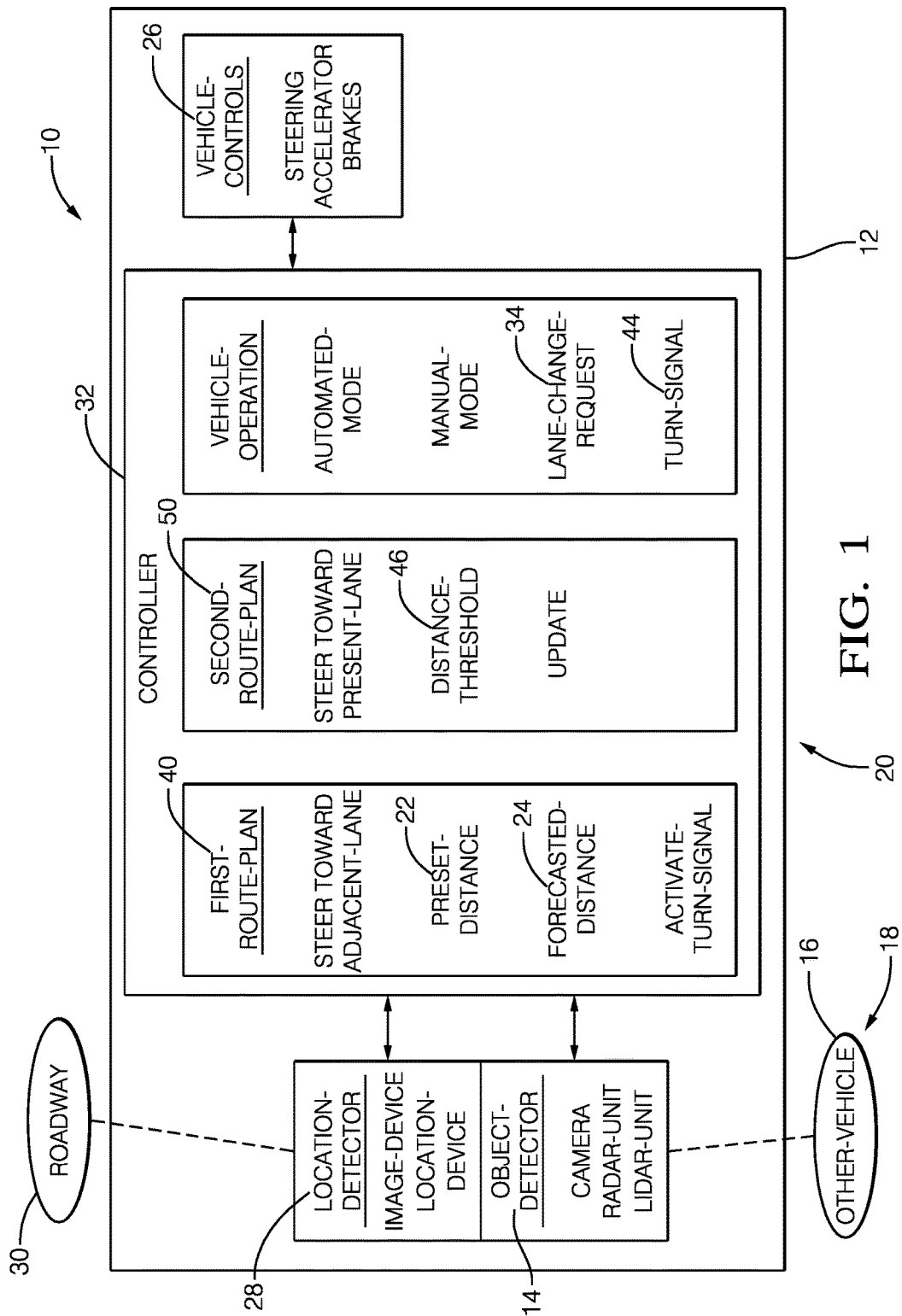
FIG. 1 is diagram of an escape-path-planning system in accordance with one embodiment.

FIG. 1 illustrates a non-limiting example of an escape-path-planning system 10, hereafter referred to as the system 10, which is generally configured to operate an automated vehicle, hereafter referred to as the host-vehicle 12. While the non-limiting examples presented herein are generally for a fully-automated or autonomous vehicle where an occupant or operator (not shown) may have little interaction with the operation of the host-vehicle 12 other than to indicate a desired destination, it is contemplated that the teachings presented herein are applicable to a partially automated vehicle that, for example, helps the operator steer the vehicle or momentarily takes-over steering of the host-vehicle 12 to avoid various circumstances including a collision. As such, the system 10 is generally configured to operate the vehicle-controls 26 of the host-vehicle 12, and do so in an automated-mode (e.g. fully-automated), a manual-mode, or some blending of the automated-mode and the manual-mode.

The system 10 includes an object-detector 14 suitable for use on the host-vehicle 12. The object-detector 14 may include, but is not limited to, a camera, or a radar-unit, or a lidar-unit, or any combination thereof. The object-detector 14 may be capable of detecting a variety of objects proximate to the host-vehicle 12, and is used by the system 10 to detect an other-vehicle 16 in an adjacent-lane 18 (FIG. 2) next to a present-lane 20 traveled by the host-vehicle 12. The object-detector 14 is preferably well-suited to determine a present-distance 22 from the host-vehicle 12 to the other-vehicle 16 prior to and while the system 10 operates the host-vehicle 12 to make a lane-change from the present-lane 20 to the adjacent-lane 18. The system 10 is also configured to predict or estimate a forecasted-distance 24 from the host-vehicle 12 to the other-vehicle 16 after the lane-change is completed to avoid a collision with and/or travel-impediment of the other-vehicle 16. The estimate of the forecasted-distance 24 may use information from the object-detector 14 and information about the host-vehicle such as present-speed, as will be recognized by those in the art.

The system 10 may also include a location-detector 28 used to determine the location or position of the host-vehicle 12 on a roadway 30, and/or information about the roadway 30 such as the number of lanes available for travel by the host-vehicle 12 and the other-vehicle 16. The location-detector 28 may include an image-device, i.e. a camera, which may be the same camera used as or by the object-detector 14. Alternatively, or in addition, the location-detector 28 may include a location-device such as global-positioning-system (GPS) receiver and a digital-map (not shown) used to determine the location or position of the host-vehicle 12 on the roadway 30.

The system 10 also includes a controller 32 in communication with the object-detector 14 and the location-detector 28 if provided. The controller 32 may include a processor (not specifically shown) such as a microprocessor or other control circuitry such as analog and/or digital control circuitry including an application specific integrated circuit (ASIC) for processing data as should be evident to those in the art. The controller 32 may include memory (not specifically shown), including non-volatile memory, such as electrically erasable programmable read-only memory (EEPROM) for storing one or more routines, thresholds, and captured data. The one or more routines may be executed by the processor to perform steps for determining the present-distance 22 and the forecasted-distance 24 based on signals received by the controller 32 from the object-detector 14 as described herein.

Figure 2:
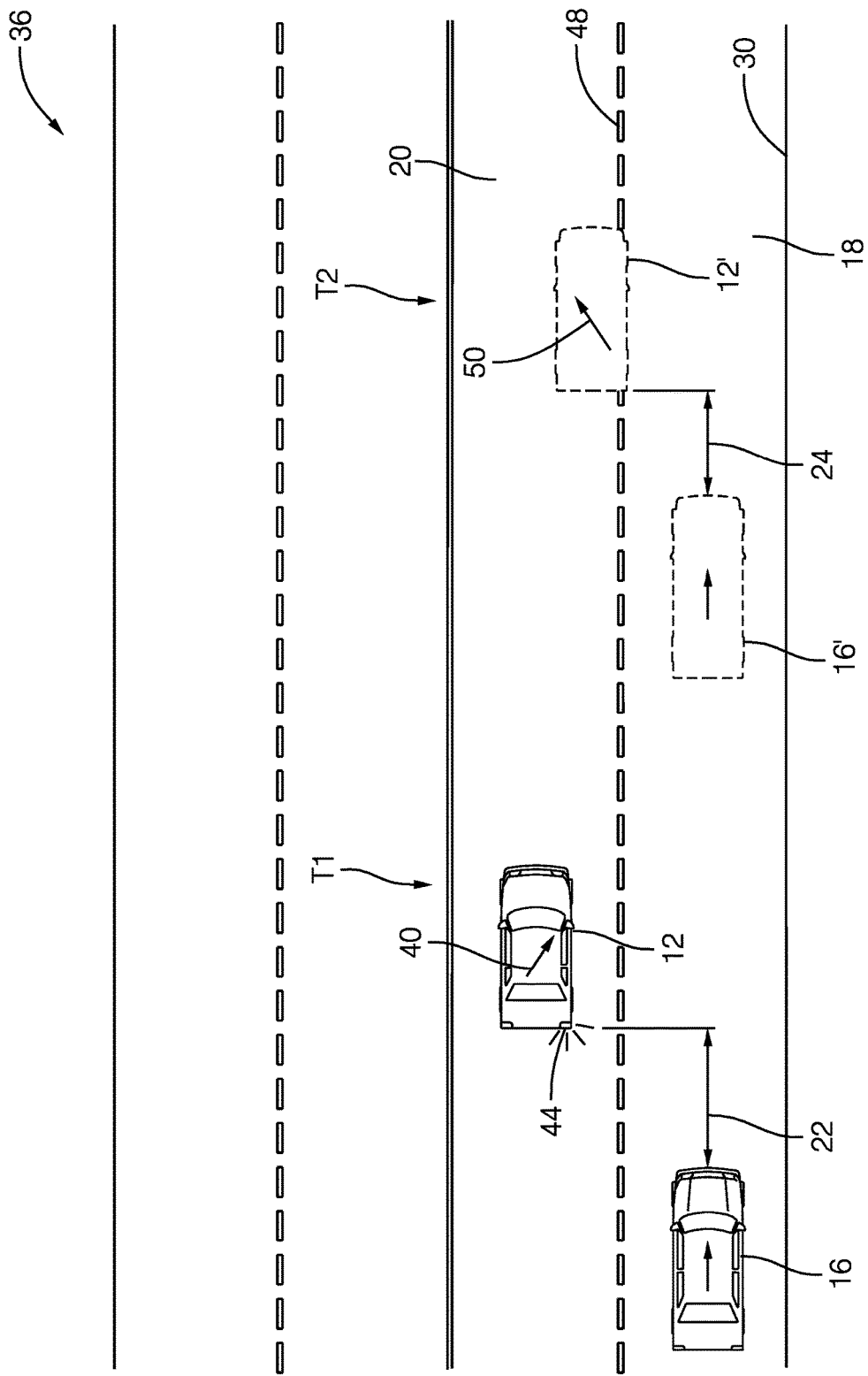
FIG. 2 is a traffic-scenario encountered by the system of FIG. 1 in accordance with one embodiment.

FIG. 2 illustrates a non-limiting example of a traffic-scenario 36 that the system 10 or the host-vehicle 12 may encounter while traveling the roadway 30. As will be recognized by those in the art, the destination of the host-vehicle 12 may require the system 10 to perform a lane-change, i.e. the controller 32 may internally generate a lane-change-request 34. Accordingly, the controller 32 is generally configured to (in response to the lane-change-request 34) determine a first-route-plan 40 that steers the host-vehicle 12 from the present-lane 20 to the adjacent-lane 18. Before initiating the first-route-plan 40 the controller 32 may use information from the object-detector 14 to determine the present-distance 22 (i.e. a longitudinal-clearance) between the host-vehicle 12 and the other-vehicle 16, and compare the present-distance 22 to a distance-threshold 46. If the present-distance 22 is greater than the distance-threshold 46, fifteen meters (15 m) for example, then the controller 32 may initiate the first-route-plan by, for example, activating a turn-signal 44 on the host-vehicle 12 indicating that the host-vehicle is about to make a lane change from the present-lane 20 to the adjacent-lane 18.

If the host-vehicle 12 and the other-vehicle 16 are traveling at the same speed, then the present-distance 22 will remain substantially unchanged while the host-vehicle 12 changes lanes, i.e. executes the first-route-plan 40. However, if there is a speed difference, particularly if the other-vehicle 16 is traveling faster than the host-vehicle 12, then it may be advantageous to predict or forecast a forecasted-distance 24 based on the speed difference and how long it will take to complete the first-route-plan 40. In other words, the forecasted-distance 24 is predicted to be the present-distance at some time in the future, e.g. at the moment the host-vehicle 12 is centered in the adjacent-lane 18 having completed the first-route-plan 40. The forecasted-distance 24 may also be advantageously compared to the distance-threshold 46 to prevent initiation of the first-route-plan if the forecasted-distance 24 is not greater than the distance-threshold 46. That is, even though the present-distance 22 is greater the distance-threshold 46, if the forecasted-distance 24 is less than the distance-threshold 46, the controller 32 may be configured to not initiate the first-route-plan 40. It is contemplated that different values of thresholds may be used for the comparison to the present-distance 22 and the forecasted-distance 24. That the same value is used in this non-limiting example is only to simplify the explanation. It is also contemplated that the distance-threshold 46 may vary with the speed of the host-vehicle 12, e.g. increase as the speed increases.

It has been observed that in some circumstances that automated vehicles may initiate a lane-change (e.g. initiate the first-route-plan 40) and start changing lanes only to discover part way through the lane-change that, for example, the forecasted-distance 24 has unexpectedly changed and has unexpectedly become less than the distance-threshold 46. For example, the other-vehicle 16 may suddenly increase speed after the first-route-plan is partially executed, e.g. when the host-vehicle 12 begins to cross a lane-marking 48 that distinguishes the present-lane 20 from the adjacent-lane 18. It has also been observed that the sudden aborting of the first-route-plan 40 in response to the forecasted-distance 24 becoming less than the distance-threshold 46 can sometime cause un-smooth or jerky motion of the host-vehicle 12.

To avoid jerky motion due to an unexpected change in operating plans, the controller 32 is configured to determine a second-route-plan 50 that, if initiated, steers the host-vehicle 12 back into the present-lane 20 or steers the host-vehicle 12 so as to stay in the present-lane 20. In particular, the controller 32 determines the second-route-plan 50 (i.e. an escape-route) prior to there being any need for the second-route-plan 50. This advanced planning avoids the computational delay caused by the controller 32 having to suddenly figure out what to do because the forecasted-distance 24 between the other-vehicle 16 and the host-vehicle 12 unexpectedly becomes less than the distance-threshold 46 after the first-route-plan 40 is initiated and/or partially executed. By providing for this pre-planning of the second-route-plan 50, a smoother (i.e. less jerky) ride is experienced by an occupant (not shown) of the host-vehicle 12. In summary, the controller 32 is configured to initiate the first-route-plan 40 when the forecasted-distance 24 between the other-vehicle 16 and the host-vehicle 12 is greater than the distance-threshold 46, and then cancel the first-route-plan 40 and select or initiate or execute the second-route-plan 50 when the forecasted-distance 24 between the other-vehicle 16 and the host-vehicle 12 becomes less than the distance-threshold 46 after the first-route-plan 40 is initiated.

It is contemplated that the value of the forecasted-distance 24 and the second-route-plan 50 will be continuously or periodically updated as the first-route-plan 40 is executed. By way of example and not limitation, the controller 32 may be configured to update repeatedly the forecasted-distance 24 and second-route-plan 50 on a periodic basis such as every fifty milliseconds (50 ms) or at an update frequency of twenty Hertz (20 Hz), which may be initiated immediately after the first-route-plan 40 is initiated. That is, as the host-vehicle 12 moves laterally from the present-lane 20 towards the adjacent-lane 18, the second-route-plan 50 is updated every 50 ms even though the forecasted-distance 24 between the other-vehicle 16 and the host-vehicle 12 is not less than the distance-threshold 46.

Referring again to FIG. 2, the host-vehicle 12 and the other-vehicle 16 are shown at a present-time T1 as being separated by the present-distance 22 which is greater than the distance-threshold 46, so the first-route-plan 40 is initiated. At a later-time T2 the forecasted-distance 24 between the future-host-vehicle 12' and the future-other-vehicle 16' is determined to be less than the distance-threshold 46. In response to that determination the first-route-plan 40 is terminated or cancelled (i.e. the plan to change-lanes is aborted) and the second-route-plan 50 is initiated to steer the future-host-vehicle 12' back towards the present-lane 20.

Other traffic-scenarios are contemplated such as a forward-vehicle (not shown) traveling in the adjacent-lane 18 forward of the host-vehicle 12 suddenly slows down after the first-route-plan 40 is initiated to change-lanes. If the system 10 or more specifically the controller 32 determines that the host-vehicle 12 will get too close to the forward-vehicle without hard-braking, the second-route-plan 50 may be initiated to avoid the forward-vehicle. Another scenario is when an entering-vehicle (not shown) is entering the roadway 30 via an entrance-ramp (not shown) that merges into the adjacent-lane 18. The host-vehicle 12 may have initiated the first-route-plan 40 to move from the present-lane 20 into the adjacent-lane 18 because it was forecasted that there would not be any interference with the merging-vehicle. However, if the merging-vehicle suddenly changes speed or acceleration-rate, subsequent determinations of the forecasted-distance 24 may indicate that some sort of interference is likely to occur, so the host-vehicle 12 aborts or cancels the first-route-plan 40 and initiates the second-route-plan 50 so the host-vehicle returns to or stays in the present-lane 20.

Figure 3:
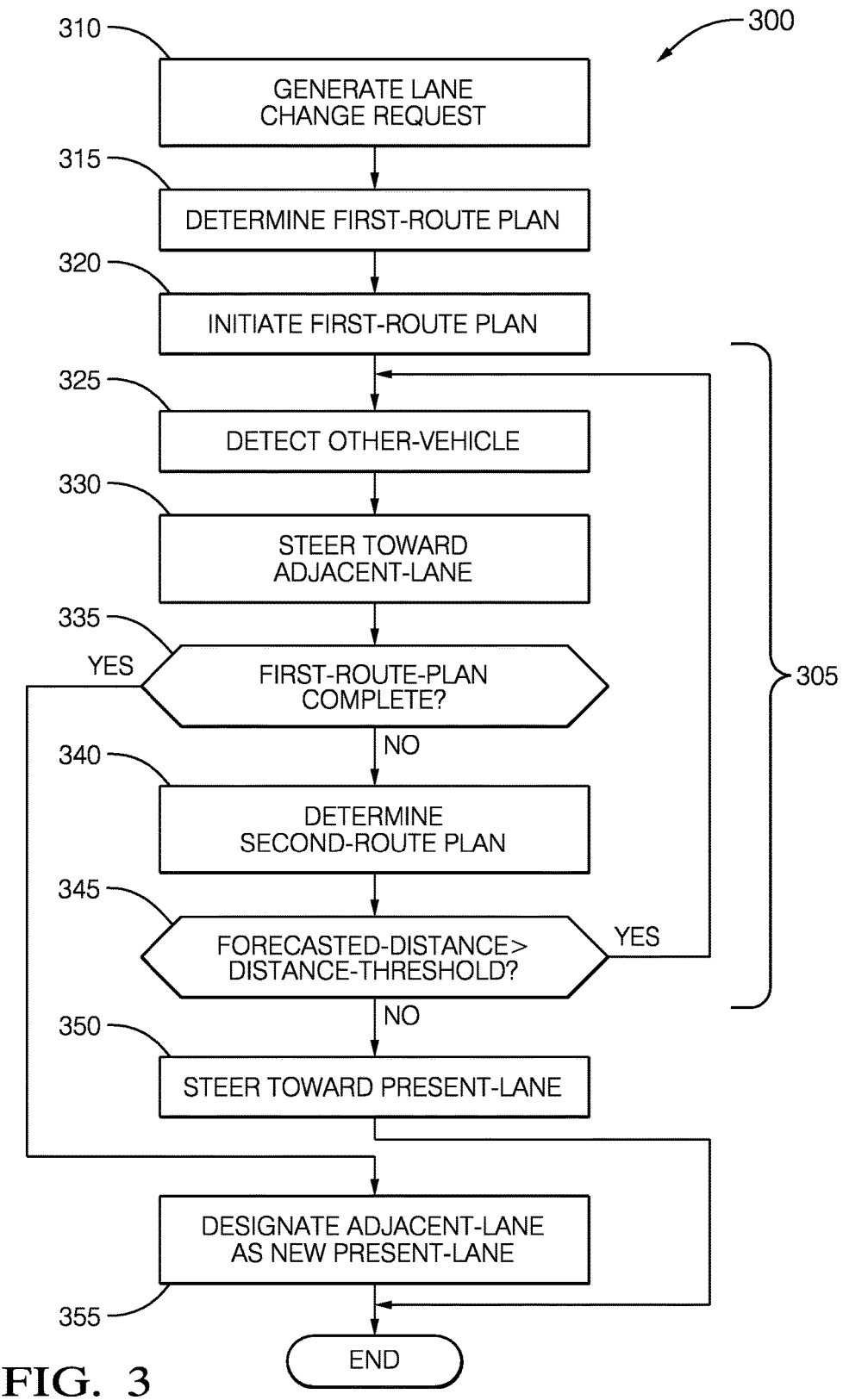
FIG. 3 is flowchart of a method of operating the system of FIG. 1 in accordance with one embodiment.

FIG. 3 illustrates a non-limiting example of a method 300 of operating the system 10. It is recognized that the specific ordering of steps 310-355 shown therein could be rearranged to accomplish the same general operation by the system 10. It is also contemplated that while in this non-limiting example all of the steps shown are generally executed by the controller 32, some of the steps may include the participation of an occupant (not shown) of the host-vehicle 12. For example, the decision to initiate a lane-change may be the result of the operator operating a turn-signal control lever rather than route-planning by the controller 32.

Step 310, GENERATE LANE-CHANGE-REQUEST, may include the controller 32 determining the location of the host-vehicle 12 on a digital-map (not shown) using information from the location-detector 28, and determining that a lane-change is necessary to travel towards a desired destination.

Step 315, DETERMINE FIRST-ROUTE-PLAN, may include determining what changes in steering-angle of the steering-wheels (not shown) of the host-vehicle 12 are necessary to make a smooth lane-change. The changes in steering-angle may take into consideration variable such as vehicle-speed, perceived road conditions (e.g. dry vs. ice-covered), and detected local driving habits.

Step 320, INITIATE FIRST-ROUTE-PLAN, may include activating the turn-signal 44.

Step 325, DETECT OTHER-VEHICLE, may include using information from the object-detector 14 to determine the present-distance 22 and the forecasted-distance 24

Step 330, STEER TOWARD ADJACENT-LANE, may include making an adjustment or change to the steering-angle so the host-vehicle 12 moves or travels toward the adjacent-lane 18.

Step 335, FIRST-ROUTE-PLAN COMPLETE?, may include determining if the host-vehicle 12 has arrived at the center of the adjacent-lane. If YES, then the method 300 skip the subsequent steps as the lane change is completed, and jumps to step 355. If NO, the method 300 proceeds to perform steps that form a recalculation-loop 305 that is repeatedly performed, every 50 ms for example, until the answer is yes, or other conditions are identified that necessitate aborting or canceling the first-route-plan 40.

Step 340, DETERMINE SECOND-ROUTE-PLAN, may include calculating what changes in steering angle are necessary to move the host-vehicle 12 back into the present-lane 20. It is emphasized that even though conditions may not warrant the immediate initiation of the second-route-plan 50, the second-route-plan 50 is recalculated every pass through the recalculation-loop 305. This is done so that the instant conditions are identified that necessitate the immediate initiation of the second-route-plan 50 there is no computational delay because the second-route-plan 50 had not been determined prior to the actual need for the second-route-plan 50.

Step 345, FORECASTED-DISTANCE>DISTANCE-THRESHOLD?, may include using information from the object-detector 14 to determine the relative-position and relative-speed of the other-vehicle 16 relative to the host-vehicle 12. Based on that relative-position and relative-speed, the forecasted-distance 24 can be determined and compared to the distance-threshold 46. If YES, i.e. the forecasted-distance 24 is greater than the distance-threshold 46 so there is no anticipated interference with the other-vehicle 16, the method 300 is looped back to step 325 as part of the recalculation-loop 305. However, if NO, i.e. the forecasted-distance 24 is not greater than the distance-threshold 46 so there is anticipated interference with the other-vehicle 16, the method 300 proceeds to step 350.

Step 350, STEER TOWARD PRESENT-LANE, may include canceling or aborting the first-route-plan 40 and initiating the second-route-plan 50 so as to steer the host-vehicle 12 back towards the present-lane 20 and thereby avoid any interference or possible collision with the other-vehicle 16. Because the second-route-plan 50 had been recently recalculated based on the latest position of the host-vehicle relative to the present-lane 20 and the adjacent-lane 18, the transition from the first-route-plan 40 to the second-route-plan 50 can be made without computational delay. By eliminating the computational delay, the transition is more likely to be smooth rather than jerky because less time is spent delaying the termination of the first-route-plan 40 if the second-route-plan was not calculated or determined until the instant it was needed.

Step 355, DESIGNATE ADJACENT-LANE AS NEW PRESENT-LANE, may include changing the designation of which lane of the roadway 30 is the present-lane once the lane change is completed.

Accordingly, an escape-path-planning system (the system 10), a controller 32 for the system 10 and a method 300 of operating the system 10 is provided. The system 10 is an improvement over prior automated vehicle control systems in that the system 10 pre-plans an escape-path or escape-route so that an alternative route (the second-route-plan 50) is instantly available if needed. It is has been observed that such pre-planning will results in a smoother travel-experience for an occupant of the host-vehicle 12. While the non-limiting examples presented herein focus on steering the host-vehicle 12 to avoid interference with the other-vehicle 16, is it contemplated that acceleration or deceleration of the host-vehicle 12 may also be used, possible in combination with steering, to avoid interference with the other-vehicle 16.

While this invention has been described in terms of the preferred embodiments thereof, it is not intended to be so limited, but rather only to the extent set forth in the claims that follow.

We claim:

1. An escape-path-planning system to operate an automated vehicle, said system comprising:
an object-detector suitable for use on a host-vehicle, said object-detector used to detect an other-vehicle behind the host-vehicle and in an adjacent-lane next to a present-lane traveled by the host-vehicle; and
a controller in communication with the object-detector, said controller configured to, in response to a lane-change-request, determine a first-route-plan that steers the host-vehicle from the present-lane to the adjacent-lane in front of the other-vehicle, determine a second-route-plan that steers the host-vehicle into the present-lane, initiate the first-route-plan when the other-vehicle is behind the host-vehicle and a forecasted-distance between the other-vehicle and the host-vehicle is greater than a distance-threshold, and cancel the first-route-plan after the first-route-plan is initiated and then select the second-route-plan when the forecasted-distance between the other-vehicle and the host-vehicle becomes less than the distance-threshold after the first-route-plan is initiated.

2. The system in accordance with claim 1, wherein the system includes a turn-signal of the host-vehicle, and the controller is configured to activate the turn-signal to initiate the first-route-plan.

3. The system in accordance with claim 1, wherein the controller is configured to determine repeatedly on a periodic basis the second-route-plan after the first-route-plan is initiated.

* * * * *